(12) United States Patent
Fukano et al.

(10) Patent No.: US 8,584,546 B2
(45) Date of Patent: Nov. 19, 2013

(54) BALL SCREW MECHANISM

(75) Inventors: Yoshihiro Fukano, Moriya (JP); Toru Sugiyama, Abiko (JP); Masaki Imamura, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 358 days.

(21) Appl. No.: 12/545,508

(22) Filed: Aug. 21, 2009

(65) Prior Publication Data

US 2010/0043583 A1 Feb. 25, 2010

(30) Foreign Application Priority Data

Aug. 21, 2008 (JP) ................................ 2008-212710

(51) Int. Cl.
*F16H 1/24* (2006.01)
(52) U.S. Cl.
USPC ....................................................... 74/424.87
(58) Field of Classification Search
USPC ............... 74/424.82, 424.86, 424.87, 424.81, 74/424.83–424.85, 424.88, 424.89
See application file for complete search history.

(56) References Cited

U.S. PATENT DOCUMENTS

| | | | | | |
|---|---|---|---|---|---|
| 2,581,482 | A | * | 1/1952 | Hawkins | 74/424.82 |
| 3,327,551 | A | * | 6/1967 | Prueter | 74/424.87 |
| 3,961,541 | A | * | 6/1976 | Fund et al. | 74/424.87 |
| 3,971,264 | A | * | 7/1976 | Detraz et al. | 74/424.87 |
| 6,112,610 | A | * | 9/2000 | Welling | 74/424.86 |
| 6,681,651 | B2 | | 1/2004 | Fujita | |
| 2001/0025540 | A1 | * | 10/2001 | Greubel | 74/424.87 |
| 2003/0213322 | A1 | * | 11/2003 | Yabe | 74/424.82 |
| 2005/0016308 | A1 | | 1/2005 | Hayashi | |
| 2006/0027038 | A1 | * | 2/2006 | Ohkubo et al. | 74/424.86 |
| 2006/0090582 | A1 | * | 5/2006 | Osterlaenger et al. | 74/424.88 |
| 2006/0248973 | A1 | * | 11/2006 | Teramachi et al. | 74/424.83 |
| 2008/0016973 | A1 | * | 1/2008 | Husistein | 74/424.87 |
| 2008/0110286 | A1 | * | 5/2008 | Nishimura et al. | 74/424.87 |
| 2009/0151493 | A1 | * | 6/2009 | Miyahara | 74/424.87 |

FOREIGN PATENT DOCUMENTS

| | | |
|---|---|---|
| CN | 1551957 A | 12/2004 |
| CN | 2777285 Y | 5/2006 |
| DE | 10 2005 026 732 A1 | 1/2006 |
| EP | 1 925 852 A1 | 5/2008 |

(Continued)

OTHER PUBLICATIONS

Korean Office Action issued Mar. 3, 2011, in Patent Application No. 10-2009-0077243 (with partial English-language translation).

(Continued)

*Primary Examiner* — Alan B Waits
(74) *Attorney, Agent, or Firm* — Oblon, Spivak, McClelland, Maier & Neustadt, L.L.P.

(57) ABSTRACT

A ball screw mechanism is equipped with a ball screw shaft formed from a metallic material, a displacement nut inserted over an outer circumferential side of the ball screw shaft, steel balls installed between a first screw groove formed on the ball screw shaft and a second screw groove formed in the displacement nut, and a pair of first and second return members, through which the steel balls are circulated between one end side and another end side of the displacement nut. The first and second return members include main body parts mounted respectively onto one end and another end of the displacement nut, and cylindrical parts that project outwardly with respect to the main body parts. A return passage, through which the steel balls are circulated, is formed inside of the main body parts and the cylindrical parts.

14 Claims, 9 Drawing Sheets

(56) References Cited

FOREIGN PATENT DOCUMENTS

| | | | | |
|---|---|---|---|---|
| JP | 06201013 A * | 7/1994 | ............ | F16H 25/22 |
| JP | 2004-340220 | 12/2004 | | |
| JP | 2005-48845 | 2/2005 | | |
| JP | 2006-342976 | 12/2006 | | |
| JP | 2007-24305 | 2/2007 | | |
| JP | 2008-25675 | 2/2008 | | |
| JP | 2008-039050 | 2/2008 | | |
| TW | 496487 | 7/2002 | | |
| WO | WO 2007023780 A1 * | 3/2007 | | |

OTHER PUBLICATIONS

Office Action issued Apr. 25, 2011, in Chinese Patent Application No. 200910170931.5 (with English-language translation).

Office Action and Search Report issued on Jan. 13, 2012, in Taiwan Patent Application No. 098126892 (with partial English translation).

Office Action issued on Feb. 8, 2012, in German Patent Application No. 10 2009 035 133.7.

Notice of Allowance with English translation of pertinent portion mailed on Mar. 5, 2013 in corresponding Japanese Patent Application No. 2008-212710 filed on Aug. 21, 2008.

* cited by examiner

BALL SCREW MECHANISM

CROSS-REFERENCE TO RELATED APPLICATION

This application is based upon and claims the benefit of priority from Patent Application No. 2008-212710 filed on Aug. 21, 2008, in the Japan Patent Office, of which the contents are incorporated herein by reference.

BACKGROUND OF THE INVENTION

1. Field of the Invention

The present invention relates to a ball screw mechanism in which a nut member is screwed on a ball screw shaft through balls, and by which the nut member is displaced axially along the ball screw shaft under the driving action of a rotary drive source.

2. Description of the Related Art

Heretofore, a ball screw mechanism has been known, which is equipped with a screw shaft having helical grooves engraved on an outer circumferential surface thereof, a cylindrical shaped nut member disposed on the outer circumferential side of the screw shaft, and balls disposed via the helical grooves between the screw shaft and the nut member.

In such a ball screw mechanism, for example, a rotary drive source such as a motor or the like is connected with respect to the screw shaft, and by rotation of the screw shaft, the rotational motion of the screw is converted through the balls into linear motion of the nut member, whereby the nut member is displaced linearly along the axis of the screw shaft.

With the aforementioned ball screw mechanism, it is necessary for balls to be circulated between the nut member and the screw shaft accompanying displacement of the nut member in the axial direction. Owing thereto, for example, as in the ball screw mechanism disclosed in Japanese Laid-Open Patent Publication No. 2005-048845, end members are provided respectively on both ends of the nut member having circulation passages therein, and a return passage is disposed along the axial direction of the nut member interconnecting the end members. Then, when the nut member is displaced along the screw shaft, the balls mounted between the nut member and the screw shaft are circulated by being moved from the helical grooves on one end side of the nut member, through the circulation path in one of the end members, to the ball return passage, through the circulation path of the other end member, and once again the balls are moved into the helical grooves at the other end side of the nut member.

However, in the aforementioned conventional art, because a ball return passage through which the balls are circulated is disposed on an outer circumferential side of a hole through which the screw shaft is inserted through the nut member, it is necessary that the nut member be diametrically expanded in a radial outward direction, by an amount corresponding to the portion of the ball return passage. As a result, the nut member becomes larger in size.

Further, the process steps for forming the ball return passage, for returning the balls along the axial direction with respect to the nut member, are troublesome. Also, because the end members are constructed so as to be installed inside both ends of the nut member, the shape of the end members and the shapes at the attachment regions of the end members in the nut member are complex. As a result, fabrication and assembly of the nut member is complicated and productivity of the ball screw mechanism is lowered.

SUMMARY OF THE INVENTION

An object of the present invention is to provide a ball screw mechanism which can be made smaller in size diametrically, while improving productivity of the ball screw mechanism.

The present invention is characterized by a ball screw shaft having a first ball screw groove engraved on an outer circumferential surface thereof, a nut member formed in a cylindrical shape and having a second ball screw groove on an inner circumferential surface thereof, the nut member being disposed on an outer circumferential side of the ball screw shaft, and being screw-engaged with respect to the ball screw shaft via balls, which are installed between the second ball screw groove and the first ball screw groove, and a circulation member connected respectively to both ends of the nut member along an axial direction thereof, for circulating the balls through a circulation passage provided on the exterior of the nut member from one end side in the displacement direction of the nut member to another end side thereof, wherein the circulation member includes a main body part installed on the nut member and a cylindrical part connected to the main body part.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
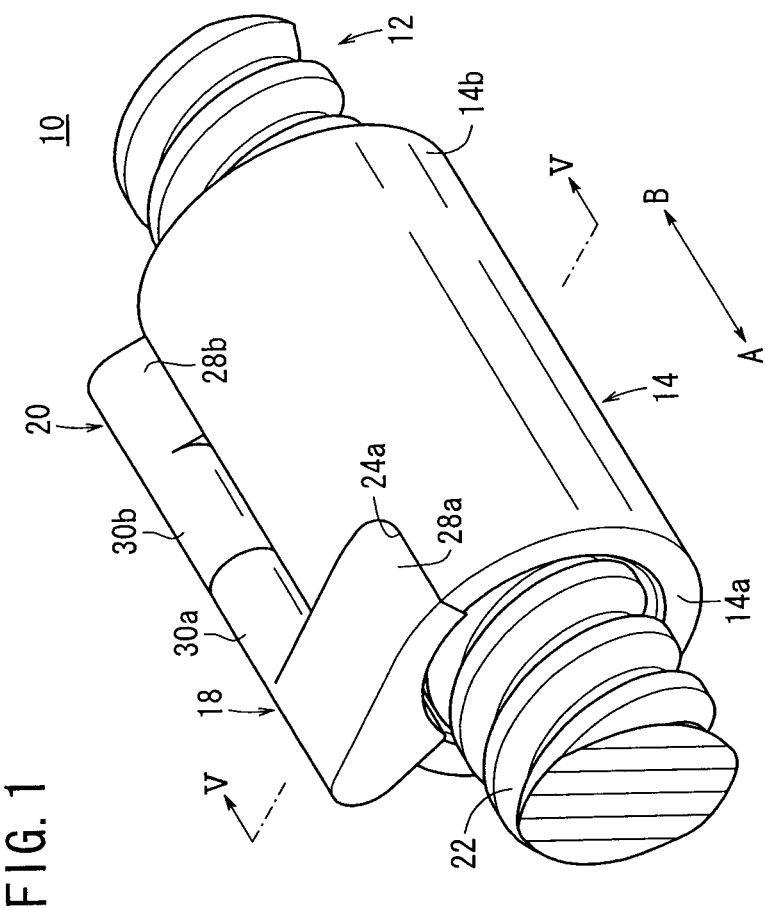
FIG. 1 is an exterior perspective view of a ball screw mechanism according to a first embodiment of the present invention.
Figure 2:
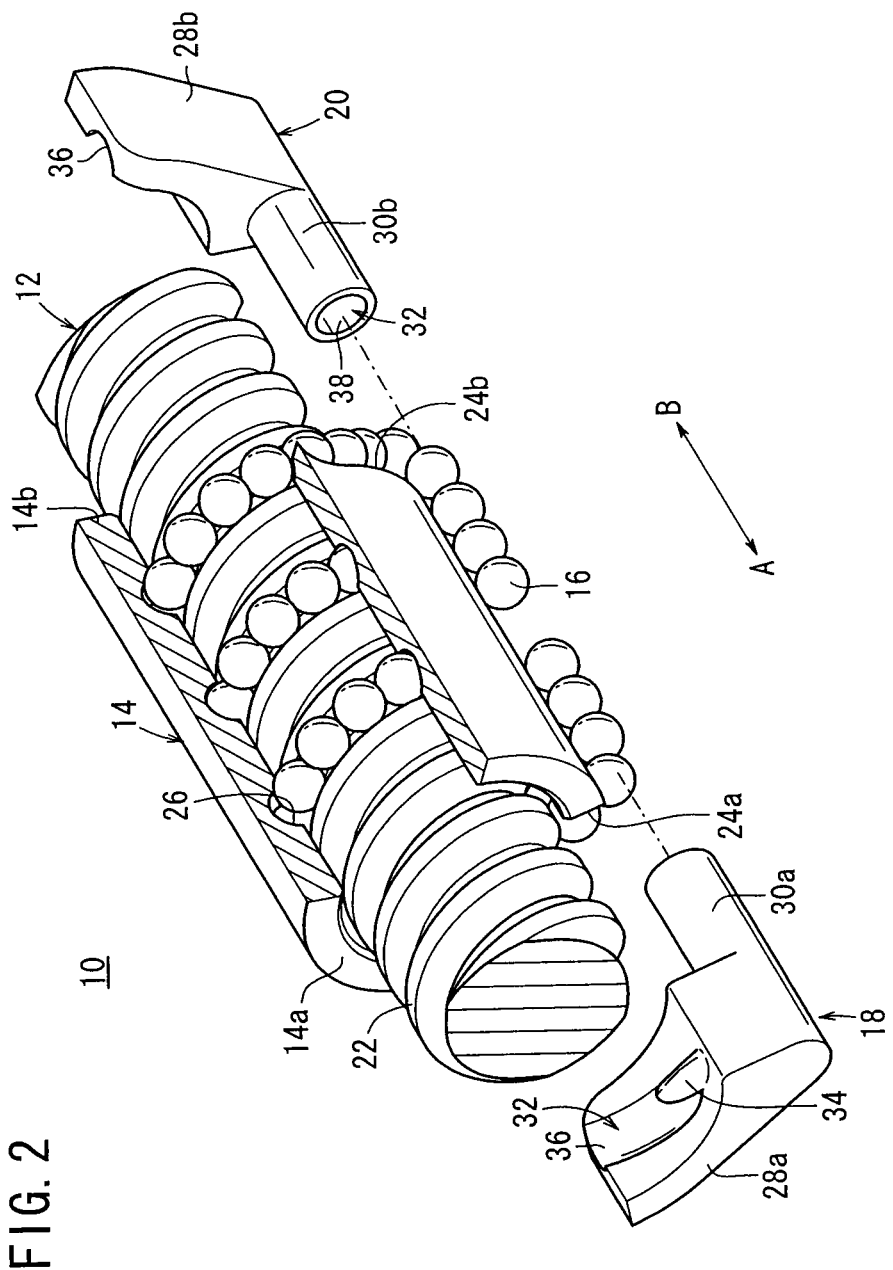
FIG. 2 is a partial cutaway exploded perspective view of the ball screw mechanism shown in FIG. 1.

In FIG. 1, reference numeral 10 indicates a ball screw mechanism according to a first embodiment of the present invention.

The ball screw mechanism 10, as shown in FIGS. 1 to 4, includes an elongate ball screw shaft 12 extending along an axial direction (the direction of arrows A and B), a displacement nut (nut member) 14 inserted displaceably over an outer circumferential side of the ball screw shaft 12, and a first return member (circulation member) 18 and a second return member (circulation member) 20 provided in a pair, through which steel balls 16 are circulated between the ball screw shaft 12 and the displacement nut 14.

The ball screw shaft 12, for example, is formed from a metallic material, and is formed with a first screw groove 22 engraved in a helical shape on the outer circumferential surface thereof along the axial direction (the direction of arrows A and B) of the ball screw shaft 12, which is recessed with a substantially semicircular shape in cross section and is formed such that portions of the steel balls 16 can be inserted into the interior of the first screw groove 22.

The displacement nut 14 is formed in a cylindrical shape, and on one end 14a side (in the direction of the arrow A) and on the other end 14b side (in the direction of the arrow B) thereof, a pair of mounting portions 24a, 24b, are disposed respectively, each of which is cut out in a substantially rectangular shape on an outer circumferential surface of the displacement nut 14. The mounting portions 24a, 24b are offset mutually along the circumferential direction about the axis of the displacement nut 14, and are formed so as to penetrate from the outer circumferential side to the inner circumferential side of the displacement nut 14 (see FIG. 4).

On the other hand, a second screw groove 26 engraved in a helical shape along the axial direction of the displacement nut 14, is provided on the inner circumferential surface of the displacement nut 14, the second screw groove 26 being formed in a confronting and parallel relation to the first screw groove 22, in a state in which the ball screw shaft 12 is inserted through the interior of the displacement nut 14. That is, the first screw groove 22 and the second screw groove 26 are formed in helical shapes, both along the same direction.

The second screw groove 26, in the same manner as the first screw groove 22, is formed with a semicircular shape in cross section, such that the steel balls 16, which are inserted into the first screw groove 22, also are inserted into the second screw groove 26. Owing thereto, the ball screw shaft 12 and the displacement nut 14 are screw-engaged with each other through the steel balls 16.

The first and second return members 18, 20 are formed, for example, from a resin material. As shown in FIGS. 2 to 6, the first and second return members 18, 20 comprise main body parts 28a, 28b, each of which is mounted into respective mounting portions 24a, 24b of the displacement nut 14, cylindrical parts 30a, 30b that project from end surfaces of the main body parts 28a, 28b, and return passages (circulation passages) 32 formed in the interiors of the main body parts 28a, 28b and the cylindrical parts 30a, 30b through which the steel balls 16 are circulated between the displacement nut 14 and the ball screw shaft 12.

Figure 4:
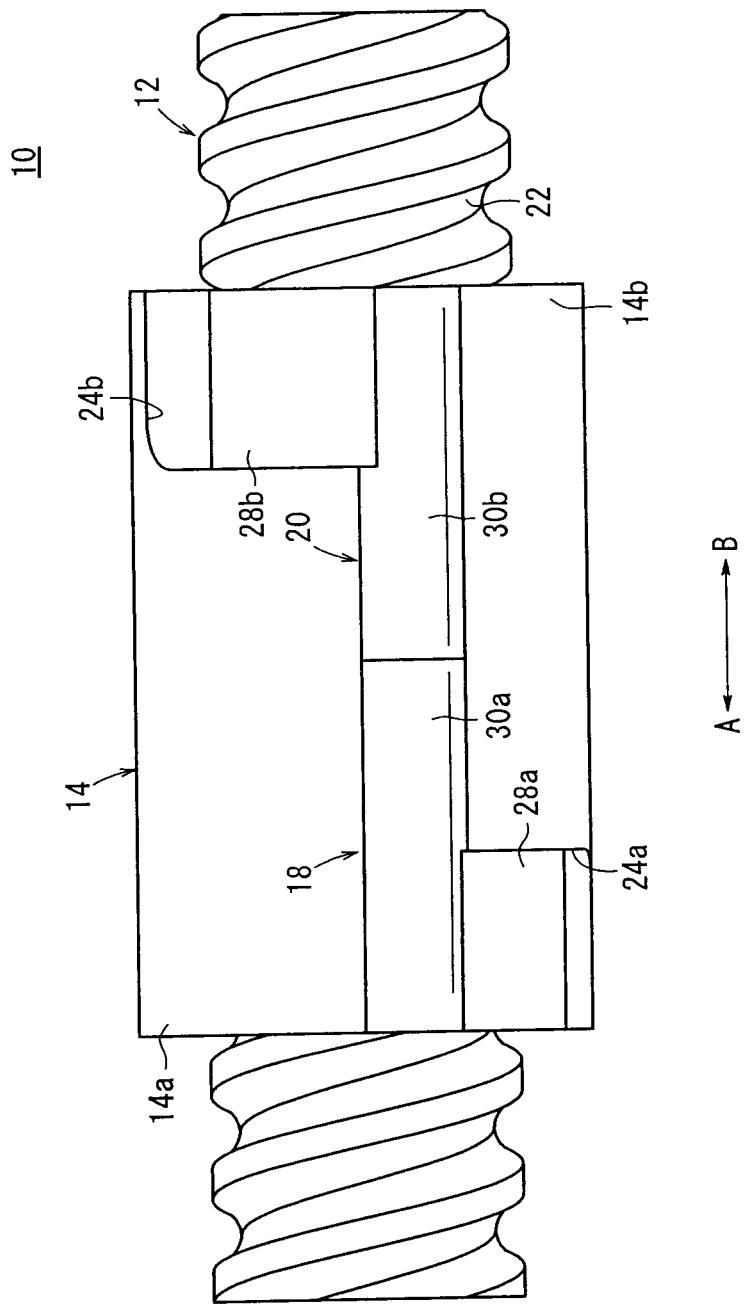
FIG. 4 is a plan view of the ball screw mechanism shown in FIG. 1.
Figure 5:
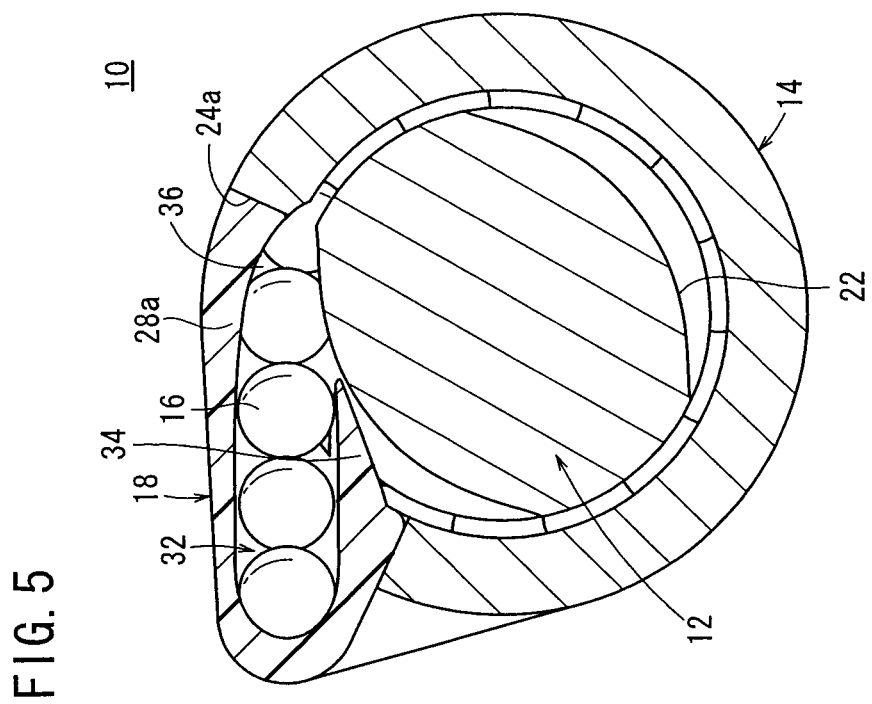
FIG. 5 is a cross sectional view taken along line V-V of FIG. 1.
Figure 6:
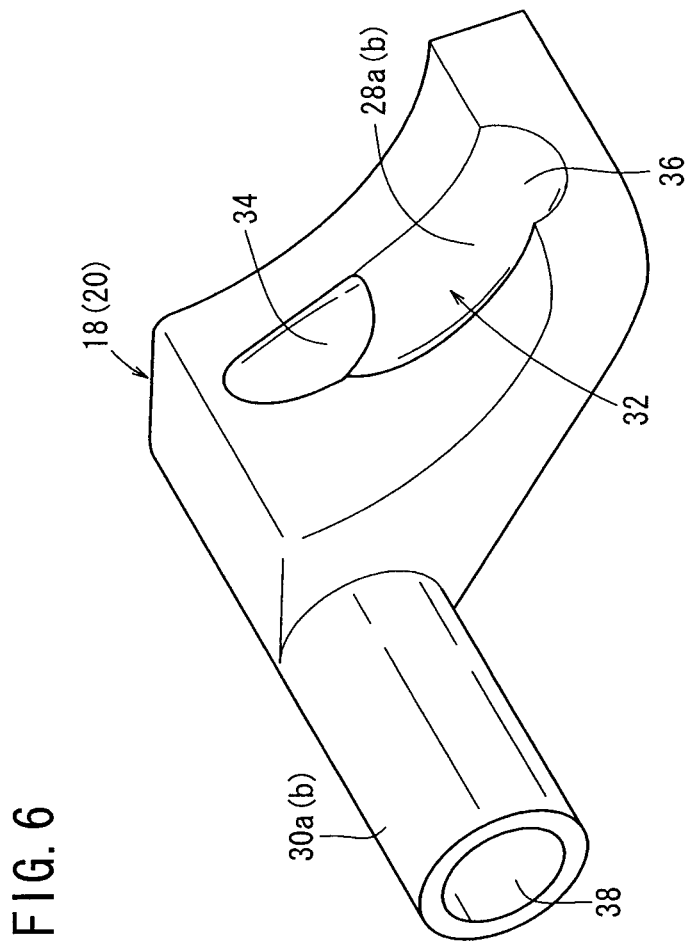
FIG. 6 is a perspective view of first and second return members, which are parts of the ball screw mechanism.

The first and second return members 18, 20 are disposed in a manner such that the main body parts 28a, 28b, which are formed in block shapes corresponding to the shape of the mounting portions 24a, 24b, cover the mounting portions 24a, 24b, and are fixed to the one end 14a and the other end 14b of the displacement nut 14 by means of adhesive bonding, retaining rings or the like, for example (see FIGS. 1 and 4). As a result, the first and second return members 18, 20 constitute a portion of the displacement nut 14.

In the main body parts 28a, 28b, inner wall surfaces thereof that face the ball screw shaft 12 are formed with arcuate shapes in cross section, having the same radius of curvature as the inner circumferential surface of the displacement nut 14. Respective portions of the return passages 32 open on the inner wall surfaces of the main body parts 28a, 28b.

Further, projections 34 are disposed on the inner wall surfaces of the main body parts 28a, 28b, which face toward the return passages 32 and expand outwardly with respect to the inner wall surfaces. The projections 34 are provided in parallel with the return passages 32. An inner surface that confronts the return passage 32 is formed with a semicircular shape in cross section and is connected to the return passage 32.

Additionally, when the steel balls 16 move from the return passage 32 to the second screw groove 26 of the displacement nut 14, as well as when the steel balls 16 move from the second screw groove 26 into the return passage 32, the steel balls 16 are guided by the projections 34. That is, the projections 34 serve a guiding function for guiding movement of the steel balls 16 between the first and second return members 18, 20 and the displacement nut 14.

The cylindrical parts 30a, 30b are formed with predetermined lengths and project perpendicularly with respect to side surfaces of the main body parts 28a, 28b. In addition, when the first and second return members 18, 20 are mounted respectively on the displacement nut 14, the cylindrical parts 30a, 30b abut respectively against the outer circumferential surface of the displacement nut 14, the cylindrical parts 30a, 30b are arranged substantially in parallel with respect to the axis of the displacement nut 14 and the ball screw shaft 12, and respective end surfaces of the cylindrical part 30a and the cylindrical part 30b, which are disposed coaxially in a mutual confronting relation, abut against each other.

The return passage 32 is formed substantially with an L-shape in cross section so as to penetrate from each of the main body parts 28a, 28b to the interior of each of the cylindrical parts 30a, 30b. The return passage 32 includes the first passage 36, which is disposed primarily in each of the main body parts 28a, 28b, and opens on the inner wall surface of each of the main body parts 28a, 28b. The return passage 32 further includes a second passage 38, which extends in a straight line along each of the cylindrical parts 30a, 30b, and opens at the other end thereof. Additionally, the first passage 36 and the second passage 38 are connected together and formed so as to be substantially perpendicular to one another. The passage diameter of the return passage 32 is set to a diameter that enables the steel balls 16 to move therethrough.

The first passage 36 is formed substantially in a helical shape similar to the second screw groove 26 formed in the displacement nut 14. When the first and second return members 18, 20 are installed into the mounting portions 24a, 24b of the displacement nut 14, the ends of the first passages 36 are connected to ends of the second screw groove 26, which extend respectively to the mounting portions 24a, 24b.

Owing thereto, the return passage 32 including the first passage 36 constitutes a rolling groove together with the second screw groove 26 in the displacement nut 14, and the steel balls 16 are capable of moving between the return passage 32 and the second screw groove 26 via the first passage 36.

The second passage 38 extends to the interior of each of the main body parts 28a, 28b from the open ends thereof and is connected to an end of the first passage 36. As a result, the first passage 36 and the second passage 38 communicate with each other.

The ball screw mechanism 10 according to the first embodiment of the present invention is constructed basically as described above. Next, explanations shall be made concerning assembly of the ball screw mechanism 10.

First, the first return member 18 is mounted on one end 14a side (in the direction of the arrow A) of the displacement nut 14. More specifically, the first return member 18 is disposed such that the cylindrical part 30a is on the side of the other end 14b (in the direction of the arrow B) of the displacement nut 14, and the cylindrical part 30a abuts against the outer circumferential surface of the displacement nut 14. On the other hand, the main body part 28a is installed with respect to the mounting portion 24a so that the projection 34 faces the inner circumferential surface of the displacement nut 14. In addition, the main body part 28a is fixed with respect to the mounting portion 24a by means of adhesive bonding, a retaining ring, or the like (not shown).

As a result, the first passage 36 of the first return member 18 is placed in a connected state with respect to an end of the second screw groove 26, which is provided on the inner circumferential surface of the displacement nut 14.

Next, after the ball screw shaft 12 has been inserted through the interior of the displacement nut 14, a plurality of steel balls 16 are inserted successively into the return passage 32 from the second passage 38 of the first return member 18. As a result, the steel balls 16 move successively to the side of the first passage 36 along the return passage 32, and through the opening of the first passage 36, the steel balls 16 are supplied to the second screw groove 26 of the displacement nut 14, as well as to the first screw groove 22 of the ball screw shaft 12.

In addition, the steel balls 16 move in a helical fashion along the second screw groove 26 and the first screw groove 22 of the ball screw shaft 12 while being retained thereby. More specifically, the plural steel balls 16 are retained between the outer circumferential surface of the ball screw shaft 12 and the inner circumferential surface of the displacement nut 14, via the first and second screw grooves 22, 26.

Next, the plural steel balls 16 are inserted with respect to the return passage 32 of the second return member 20, and the steel balls 16 are retained inside the return passage 32 through a grease (not shown), which is coated with respect to the first and second passages 36, 38. More specifically, by means of the grease, which has a predetermined viscosity, the steel balls 16 are prevented from rolling outside of the return passage 32.

Figure 3:
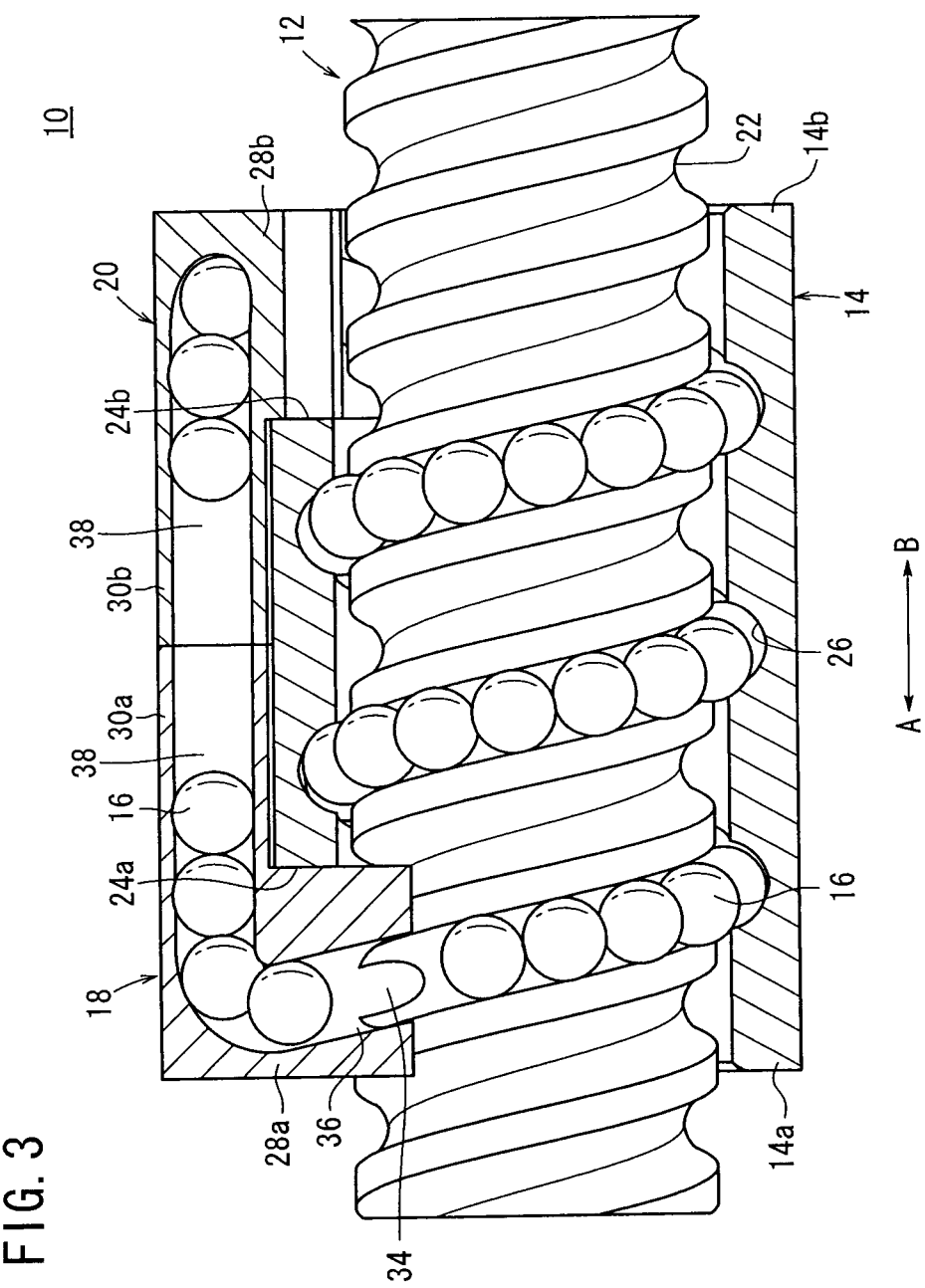
FIG. 3 is a longitudinal sectional view taken along the axial direction of the ball screw mechanism shown in FIG. 1.

Finally, the main body part 28b of the second return member 20 is disposed in the mounting portion 24b formed in the other end 14b of the displacement nut 14, and the cylindrical part 30b is arranged to face toward the end 14a side (in the direction of the arrow A) of the displacement nut 14 so as to abut against the outer circumferential surface of the displacement nut 14, and further, the end surface thereof abuts against the end surface of the cylindrical part 30a of the first return member 18 (see FIGS. 1 and 3). Owing thereto, the cylindrical parts 30a, 30b in the first and second return members 18, 20 abut against each other, and the return passages 32 are placed in a state of communication through the respective second passages 38 (see FIG. 3). As a result, a circulation path, in which the steel balls 16 can be circulated, is constituted by the return passages 32 of the first and second return members 18, 20 and the first and second screw grooves 22, 26, while the plural steel balls 16 are kept in a retained state within the return passages 32 and the first and second screw grooves 22, 26.

Further, the first passage 36 in the second return member 20 is connected with the other end of the second screw groove 26 disposed on the inner circumferential surface of the displacement nut 14.

Additionally, the second return member 20, in the same manner as the first return member 18, is fixed integrally with respect to the mounting portion 24b by means of adhesive bonding, a retaining ring, or the like (not shown).

Next, operations and effects of the ball screw mechanism 10 assembled in the foregoing manner shall be explained. Herein, such explanations concern a case in which a non-illustrated rotary drive source (e.g., a stepping motor) is connected to an end of the ball screw shaft 12 that makes up the ball screw mechanism 10, and the displacement nut 14 is displaced toward one end 14a side (in the direction of the arrow A) thereof.

First, the rotary drive source is rotated and the ball screw shaft 12 is driven thereby, whereupon the rotational force of the ball screw shaft 12 is transmitted to the displacement nut 14, which is screw-engaged with the ball screw shaft 12 through the plurality of steel balls 16. The displacement nut 14 is displaced along the axial direction of the ball screw shaft 12 from one end 14a side thereof (in the direction of the arrow A). Because displacement of the displacement nut 14 is limited in the rotational direction by an unillustrated rotary stop means, the displacement nut 14 does not rotate but is displaced only along the axial direction (the direction of the arrow A).

At this time, the steel balls 16 are delivered successively into the first passage 36 of the first return member 18 from the first and second screw grooves 22, 26, in the side (in the direction of the arrow A) of one end 14a of the displacement nut 14 while the displacement nut 14 is displacing, and the steel balls 16 preloaded inside of the return passage 32 are pressed by other steel balls 16, which are delivered from the first passage 36, whereby the steel balls 16 are moved along the return passage 32 in a direction (the direction of the arrow B) opposite to the advancement direction (the direction of the arrow A) of the displacement nut 14.

In addition, the steel balls 16, after having been moved toward the side of the second return member 20, reach the first passage 36 of the second return member 20 and are supplied and loaded into the first and second screw grooves 22, 26 at the other end 14b side (in the direction of the arrow B) of the displacement nut 14.

Specifically, the plural steel balls 16 are circulated through the cylindrical parts 30a, 30b of the first and second return members 18, 20, which are disposed on the outer circumferential side of the displacement nut 14, and once again are supplied into the region between the displacement nut 14 and the ball screw shaft 12.

Stated otherwise, the plural steel balls 16 are circulated from the first passage 36 through the second passage 38, and once again are delivered from the other first passage 36 to the region between the displacement nut 14 and the ball screw shaft 12.

Further, the steel balls 16 are smoothly and reliably guided from the first and second screw grooves 22, 26 to the first passage 36 by the projection 34 of the first return member 18, while at the same time, the steel balls 16 are smoothly and reliably guided and reloaded from the first passage 36 into the first and second screw grooves 22, 26 by the projection 34 of the second return member 20.

On the other hand, by reversing the characteristic (polarity) of the current, which is supplied to the rotary drive source from the power source (not shown), the ball screw shaft 12 is rotated in an opposite direction, whereupon the rotational force of the ball screw shaft 12 is transmitted to the displacement nut 14 which is screw-engaged with the ball screw shaft 12 through the steel balls 16. Accordingly, the displacement nut 14 is displaced in the axial direction (the direction of the arrow B) of the ball screw shaft 12 from the other end 14b side thereof.

At this time, the steel balls 16 move along the first and second screw grooves 22, 26 due to the displacement of the displacement nut 14, and after having reached the other end 14b side (in the direction of the arrow B) of the displacement nut 14, the steel balls 16 are delivered into the first passage 36 of the second return member 20.

In addition, the steel balls 16 preloaded inside of the return passage 32 are pressed by other steel balls 16, which are delivered from the first passage 36 of the second return member 20, whereby the steel balls 16 are moved in a direction (the direction of the arrow A) opposite to the advancement direction (the direction of the arrow B) of the displacement nut 14, along the second passage 38 of the return passage 32. Further, the steel balls 16 reach the first passage 36 of the first return member 18, whereupon they are supplied and loaded into the first and second screw grooves 22, 26 at the end 14a side (in the direction of the arrow A) of the displacement nut 14.

Specifically, the plural steel balls 16, which are extracted from the end in the advancement direction of the displacement nut 14, move in a direction opposite to the advancement direction of the displacement nut 14 inside the return passages 32 of the first and second return members 18, 20, and then are returned to the region between the displacement nut 14 and the ball screw shaft 12 from the end of the displacement nut 14 on the side opposite to the advancement direction thereof.

In this manner, when the displacement nut 14 is displaced in the axial direction (the direction of arrows A and B) under a rotary action of the ball screw shaft 12, the steel balls 16 retained between the ball screw shaft 12 and the displacement nut 14 are circulated continuously through the return passages 32 provided on the exterior of the displacement nut 14.

In the foregoing manner, according to the first embodiment, a structure is provided such that when the plural steel balls 16 are circulated accompanying displacement of the displacement nut 14, the steel balls 16 are capable of being circulated at an outer side (in a radial outward direction) of the displacement nut 14 through the return passages 32 provided in the first and second return members 18, 20. Owing thereto, compared to a conventional ball screw mechanism in which the passage (ball return passage) for circulating the steel balls 16 was provided in the nut member, the radial dimension of the displacement nut 14 can be suppressed. As a result, the displacement nut 14 can be made smaller in size in a radial direction thereof, and along therewith, the ball screw mechanism 10 including the displacement nut 14 can be reduced in scale.

More specifically, with the ball screw mechanism 10, because the cylindrical parts 30a, 30b of the first and second return members 18, 20 are disposed on the outer circumferential side of the displacement nut 14, at the region thereof that includes the cylindrical parts 30a, 30b, the radial dimension of the ball screw mechanism 10 is roughly the same as that of the conventional ball screw mechanism. However, apart from the region where the cylindrical parts 30a, 30b are disposed, the radial dimension of the displacement nut 14 is made smaller than that of the conventional ball screw mechanism. Owing thereto, compared to the conventional ball screw mechanism, which has a nut member expanded in diameter in a radial outward direction over the entire circumference thereof, the ball screw mechanism 10 can be reduced in size in the radial direction.

Further, by means of a simple operation, whereby the first and second return members 18, 20 are mounted in the mounting portions 24a, 24b provided in one end 14a and the other end 14b of the displacement nut 14, a structure can be provided constituting a ball circulation passage, by which the steel balls 16 are circulated through the return passages 32 provided in the first and second return members 18, 20. Furthermore, due to the first and second return members 18, 20 being made as molded components, which are molded, for example, from a resin material or the like, a process step for fabricating the return passages 32 is unnecessary, thus enabling the ball screw mechanism 10 to be formed easily. As a result, productivity of the ball screw mechanism 10 including the first and second return members 18, 20 can be improved, together with enabling a reduction in manufacturing costs.

Furthermore, because the first return member 18 and the second return member 20 both have the same shape, such parts can be utilized in common, and compared to a case in which the first and second return members have different respective shapes, costs can be reduced.

Still further, because the ball screw mechanism 10 can be utilized even in cases where the interval of the screw grooves (threads) in the first and second screw grooves 22, 26 has a small lead, as well as in cases where the interval of the screw grooves has a large lead, the conditions for use of the ball screw mechanism 10 are not restricted, and the mechanism can be used for a wide variety of intended uses.

Figure 7:
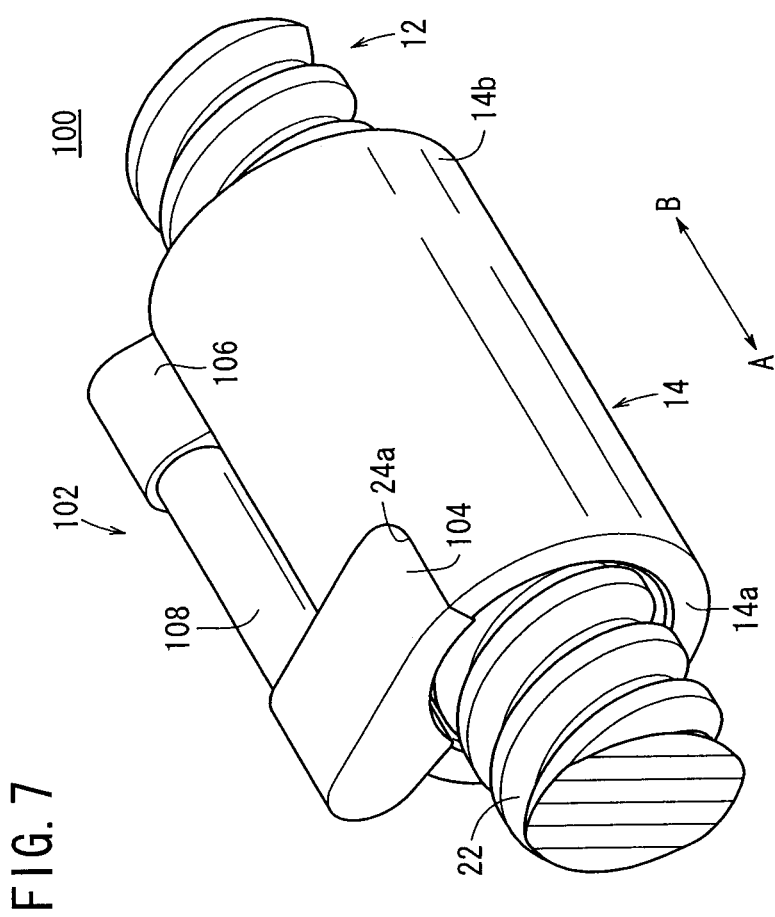
FIG. 7 is an exterior perspective view of a ball screw mechanism according to a second embodiment of the present invention.
Figure 8:
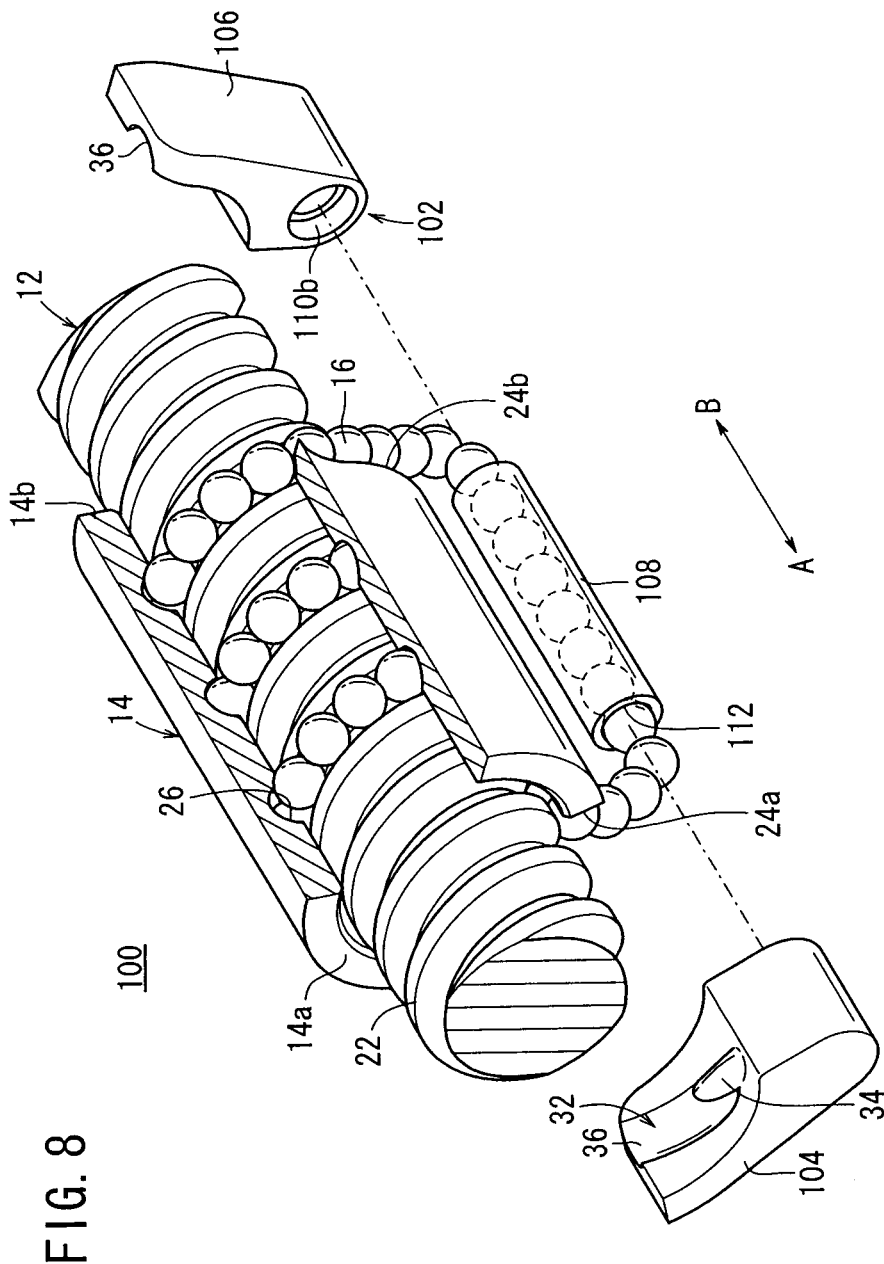
FIG. 8 is a partial cutaway exploded perspective view of the ball screw mechanism shown in FIG. 7.
Figure 9:
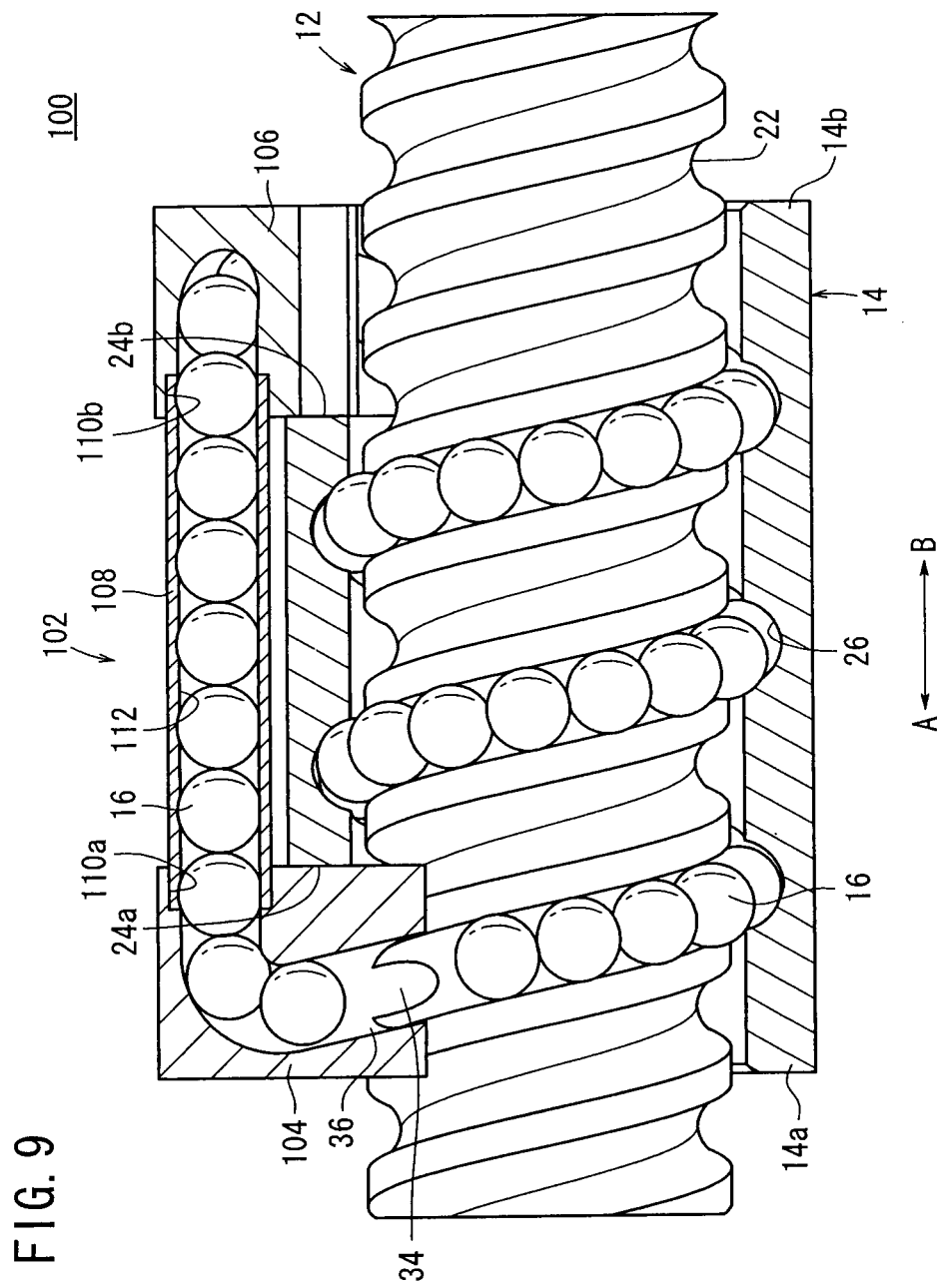
FIG. 9 is a longitudinal sectional view taken along the axial direction of the ball screw mechanism shown in FIG. 7.

Next, a ball screw mechanism 100 according to a second embodiment of the present invention is shown in FIGS. 7 to 9. Components of the ball screw mechanism 100 that are identical to those of the ball screw mechanism 10 according to the first embodiment are denoted by identical reference characters, and detailed explanation thereof will be omitted.

The ball screw mechanism 100 according to the second embodiment differs from the ball screw mechanism 10 according to the first embodiment in that a return member 102 comprises three components, i.e., a pair of base members 104, 106, and a cylindrical member 108 connecting the one base member 104 and the other base member 106.

As shown in FIGS. 7 to 9, the return member 102 is formed, for example, from a resin material. The base members 104, 106 are mounted into respective mounting portions 24a, 24b of a displacement nut 14. Both ends of the cylindrical member 108 are fitted into recesses 110a, 110b, respectively, formed at end faces of the base member 104, 106.

The base members 104, 106, which are formed in block shapes corresponding to the shape of the mounting portions 24a, 24b formed on the displacement nut 14, cover the mounting portions 24a, 24b.

In the base members 104, 106, inner wall surfaces thereof that face the ball screw shaft 12 are formed with arcuate shapes in cross section, having the same radius of curvature as the inner circumferential surface of the displacement nut 14. Respective portions of the return passages 32 open on the inner wall surfaces of the base members 104, 106.

The cylindrical member 108 is a tubular body having a predetermined length along an axial direction thereof. Inside the cylindrical member 108, a communication passage 112 is provided for circulating the steel balls 16 between the displacement nut 14 and the ball screw shaft 12. The cylindrical member 108 is connected between the one base member 104 and the other base member 106 for communication between the return passages 32 of the base members 104, 106 and the communication passage 112. The steel balls 16 are circulated, for example, from the one base member 104 to the other base member 106 through the cylindrical member 108.

In the foregoing manner, in the second embodiment, the return member 102 is constituted by the pair of base members 104, 106, and the cylindrical member 108 connecting the one base member 104 and the other base member 106. Thus, for example, even when the number of screw threads of the displacement nut 14 with respect to the ball screw shaft 12 is changed, it is possible to reliably and easily respond to the change in a length of the displacement nut 14 in a longitudinal direction, by replacing the cylindrical member 108 with another cylindrical member having a suitable length.

Specifically, in the return member 102, the cylindrical member 108 is detachable from the base members 104, 106. Thus, even when a length of the displacement nut 14 in the longitudinal direction is changed, it is possible to easily meet the change by adjusting a length of the cylindrical member 108. Since it is not necessary to set separate return members for a plurality of types of the displacement nuts 14, manufacturing costs can be reduced.

The ball screw mechanism according to the present invention is not limited to the above-described embodiment, and it is a matter of course that various structures could be adopted and/or modified without deviating from the essential gist of the invention.

What is claimed is:

1. A ball screw mechanism, comprising:
    a ball screw shaft having a first ball screw groove engraved on an outer circumferential surface thereof;
    a nut member formed in a cylindrical shape and having a second ball screw groove on an inner circumferential surface thereof, the nut member being disposed on an outer circumferential side of the ball screw shaft, and being screw-engaged with respect to the ball screw shaft via balls which are installed between the second ball screw groove and the first ball screw groove; and
    one circulation member connected to both ends of the nut member along an axial direction thereof, which circulates the balls through a circulation passage provided on an exterior of the nut member from one end side in a displacement direction of the nut member to the another end side thereof,
    wherein the circulation member includes two main body parts each fixed to a respective end surface of the nut member without covering an entirety of the respective end surface, each of the main body parts including an uncovered outermost end in the axial direction, and includes a cylindrical part connected to the main body part, and
    the circulation member includes the main body parts installed on a pair of mounting portions each of which is cut out in a three-sided shape on an outer circumferential surface of each of the ends of the nut member and each of which extends to a respective outermost axial end of the nut member, the cylindrical part is disposed on an outer circumferential side of the nut member, and a portion of the circulation passage is formed in the interior of the cylindrical part.

2. The ball screw mechanism according to claim 1, wherein the circulation passage is formed inside of the main body parts and the cylindrical part, both ends of the circulation passage being connected respectively to the second ball screw groove.

3. The ball screw mechanism according to claim 1, wherein the circulation member includes a pair of circulation parts that each include one of the two main body parts, which are installed respectively into the mounting portions of the nut member, the circulation parts covering the outer circumferential side of the ball screw shaft that is inserted through the interior of the nut member.

4. The ball screw mechanism according to claim 3, wherein the circulation passage includes:
    a first passage provided in each of the main body parts and connected to a respective end of the second ball screw groove; and
    a second passage formed in the cylindrical part and extending along the axial direction of the cylindrical part.

5. The ball screw mechanism according to claim 4, wherein the main body parts are connected substantially perpendicularly to the cylindrical part, the cylindrical part including two cylindrical sections, and one cylindrical section of one circulation part and another cylindrical section of another circulation part are connected to each other such that the second passage extends through the two cylindrical sections.

6. The ball screw mechanism according to claim 5, wherein the first passage in each of the main body parts is formed in a helical shape connected to a respective end of the second ball screw groove, thereby forming a rolling groove together with the second ball screw groove.

7. The ball screw mechanism according to claim 1, wherein, in each of the main body parts, an interior wall surface facing the ball screw shaft is formed in an arcuate shape at a same radius of curvature as the inner circumferential surface of the nut member.

8. The ball screw mechanism according to claim 7, wherein a projection is disposed on the interior wall surface of each of the main body parts, which projects outwardly with respect to the interior wall surface facing the circulation passage, the projection being disposed in parallel with the circulation passage, and an inside surface facing the circulation passage is connected with the circulation passage and is formed with a semicircular shape in cross section.

9. The ball screw mechanism according to claim 8, wherein the balls are guided by the projection when the balls move from the circulation passage into the second ball screw groove, and when the balls move from the second ball screw groove into the circulation passage.

10. The ball screw mechanism according to claim 1, wherein in the circulation member, the cylindrical part is detachably connected to the main body parts.

11. The ball screw mechanism according to claim 1, wherein the main body parts are each fixed to the respective end surface of the nut member by adhesive bonding or retaining rings.

12. The ball screw mechanism according to claim 1, wherein a widest wall thickness of the nut member in a radial direction is smaller than a diameter of one of the balls.

13. The ball screw mechanism according to claim 1, wherein the cylindrical part is offset from an outer circumferential surface of the nut member by a gap.

14. The ball screw mechanism according to claim 1, wherein the uncovered outermost end in the axial direction of each of the main body parts is flush with a respective outermost axial end of the nut member.

* * * * *